US 011853936B2

(12) United States Patent
McGuire et al.

(10) Patent No.: US 11,853,936 B2
(45) Date of Patent: Dec. 26, 2023

(54) MINIMIZING THE ENVIRONMENTAL IMPACT OF WORKLOADS

(71) Applicant: KYNDRYL, INC., New York, NY (US)

(72) Inventors: Michael James McGuire, Sydney (AU); James David Cleaver, Grose Wold (AU); Seema Nagar, Bangalore (IN); Pramod Vadayadiyil Raveendran, Machiplavu (IN); Vikramsihn Ashok Desai, Bangalore (IN); Thuy Luong, Kellyville (AU)

(73) Assignee: Kyndryl, Inc., New York, NY (US)

( * ) Notice: Subject to any disclaimer, the term of this patent is extended or adjusted under 35 U.S.C. 154(b) by 216 days.

(21) Appl. No.: 17/304,022

(22) Filed: Jun. 14, 2021

(65) Prior Publication Data

US 2022/0398515 A1  Dec. 15, 2022

(51) Int. Cl.
*G06Q 10/0631* (2023.01)
*G06Q 10/0637* (2023.01)
(Continued)

(52) U.S. Cl.
CPC ... *G06Q 10/06312* (2013.01); *G06F 11/3428* (2013.01); *G06F 16/214* (2019.01); *G06F 16/27* (2019.01); *G06Q 10/06375* (2013.01)

(58) Field of Classification Search
CPC ........ G06Q 10/06312; G06Q 10/06375; G06F 11/3428; G06F 16/214; G06F 16/27; Y02D 10/00
See application file for complete search history.

(56) References Cited

U.S. PATENT DOCUMENTS

| 8,560,677 B2 * | 10/2013 | VanGilder | G06F 1/206 |
| | | | 709/224 |
| 8,621,248 B1 * | 12/2013 | Weber | G06F 30/20 |
| | | | 713/320 |

(Continued)

FOREIGN PATENT DOCUMENTS

| IN | 201911000929 A | 2/2019 | | |
| WO | WO-2014137559 A1 * | 9/2014 | ............. | G06Q 10/04 |
| WO | WO-2021108745 A1 * | 6/2021 | ............. | H02J 3/003 |

OTHER PUBLICATIONS

"Energy Consumption Optimization Scheme of Cloud Data Center Based on SDN", by Qing Liao and Zun Wang, Beijing Key Laboratory of Network System Architecture and Convergence, Beijing University, China. 8th International Congress of Information and Communication Technology, 2018. (Year: 2018).*

(Continued)

*Primary Examiner* — Pan G Choy (57) ABSTRACT

In an approach to improve multi-data center environments by minimizing the environmental impact of workloads in multi-data center environments embodiments migrate at least a portion of one or more workloads between one or more data centers automatically to maximize a usage of renewable energy based on a predetermined threshold score of input power and a combination of renewal energy sources. Further, embodiments dictate, by a policy engine, where at least a portion of the one or more workloads can be hosted. Additionally, embodiments control, by a scheduling engine, how, when, and where at least a portion of the one or more workloads will migrate, and perform data replication to migrate data between a plurality of data center locations.

20 Claims, 3 Drawing Sheets

(51) Int. Cl.
  *G06F 11/34* (2006.01)
  *G06F 16/27* (2019.01)
  *G06F 16/21* (2019.01)

(56) References Cited

U.S. PATENT DOCUMENTS

| | | | |
|---|---|---|---|
| 9,207,993 B2 | 12/2015 | Jain | |
| 9,405,348 B2 | 8/2016 | Jackson | |
| 9,578,088 B2 | 2/2017 | Nickolov | |
| 2010/0037225 A1 | 2/2010 | Doyle | |
| 2012/0066519 A1* | 3/2012 | El-Essawy | H04L 67/12 713/300 |
| 2013/0124267 A1* | 5/2013 | O'Sullivan | G06Q 10/063 12 705/7.36 |
| 2013/0190899 A1* | 7/2013 | Slessman | G06Q 10/04 700/28 |
| 2015/0088586 A1* | 3/2015 | Pavlas | G06Q 10/063 15 718/1 |
| 2015/0339159 A1 | 11/2015 | Gupta | |
| 2017/0109205 A1* | 4/2017 | Ahuja | G06F 9/5094 |
| 2017/0331325 A1* | 11/2017 | Ristau | H02J 3/38 |
| 2018/0213036 A1* | 7/2018 | Vasetsky | H04L 41/082 |
| 2019/0008072 A1 | 1/2019 | Morgan | |
| 2021/0342185 A1* | 11/2021 | Naidu | G06F 1/3206 |

OTHER PUBLICATIONS

Moises Levy, "New Family of Data Center Metrics Using A Multi-dimensional Approach for a Holistic Understanding", Faculty of College of Engineering and Computer Sciences, Florida Atlantic University, Boca Raton, FL. Dec. 2019. (Year: 2019).*

Justin D. Moore, "Automated Cost-Aware Data Center Management", Department of Computer Science in the Graduate School of Duke University, 2006 (Year: 2006).*

"What is PUE / DCIE? How to Calculate, What to Measure", 42u Solutions for the Next Generation Data Center, Copyright © 1995-2021, 12 pages, <https://www.42u.com/measurement/pue-dcie.htm>.

Chaddad et al., "Power-Aware Workload Allocation for Green Data Centers", Article in Management of Environmental Quality An International Journal • Apr. 2018, 29 pages, <https://www.researchgate.net/publication/324492142_Power-Aware_Workload_Allocation_for_Green_Data_Centers>.

Fontecchio, Mark, "power usage effectiveness (PUE)", Tech Target, SearchDataCenter, last updated, Apr. 2009, 4 pages, <https://searchdatacenter.techtarget.com/definition/power-usage-effectiveness-PUE>.

Goiri et al., "Designing and Managing Datacenters Powered by Renewable Energy", IEEE Computer Society, copyright 2014, 9 pages, <https://ieeexplore.ieee.org/document/6756707>.

Miller, Rich, "Google Shifting Server Workloads to Use More Renewable Energy", Data Center Frontier, Apr. 22, 2020, 7 pages, <https://datacenterfrontier.com/google-shifting-server-workloads-to-use-more-renewable-energy/>.

Su, Lian Jye, "Environmentally Sustainable 5G Deployment: Energy Consumption Analysis and Best Practices", ABI Research, Published Sep. 2020, 12 pages, <https://www.interdigital.com/white_papers/environmentally-sustainable-5g-deployment>.

Wadhwa et al., "Energy and Carbon Efficient VM Placement and Migration Technique for Green Cloud Datacenters", IEEE, Conference Paper • Aug. 2014, 6 pages, <https://ieeexplore.ieee.org/abstract/document/6897171>.

Xu et al., "A Self-adaptive Approach for Managing Applications and Harnessing Renewable Energy for Sustainable Cloud Computing", Journal of Latex Class Files, vol. 6, No. 1, Jan. 2007, 15 pages, <https://ieeexplore.ieee.org/document/9162490>.

* cited by examiner

MINIMIZING THE ENVIRONMENTAL IMPACT OF WORKLOADS

BACKGROUND OF THE INVENTION

The present invention relates generally to the field multi-data center environments, and more particularly to minimizing the environmental impact of workloads in multi-data center environments.

A data center is a building, dedicated space within a building, or a group of buildings used to house computer systems and associated components, such as telecommunications and storage systems. Since information technology (IT) operations are crucial for business continuity, data centers generally include redundant or backup components and infrastructure for power supply, data communication connections, environmental controls (e.g., air conditioning, fire suppression) and various security devices. A large data center is an industrial-scale operation using as much electricity as a small town. A workload refers to a computer system's ability to handle and process work. A mobile or small data center can be as small as a container sized, whilst it has a smaller computing footprint, it is optimized to be able to be migrated and close to consumers. An example being small data centers located with telephone exchanges.

Benchmarking a data center's energy efficiency is a step towards reducing power consumption and related energy costs. Benchmarking enables a user to understand the current level of efficiency in a data center, and as a user implements additional efficiency best practices, it helps the user gauge the effectiveness of those efficiency efforts. Power Usage Effectiveness (PUE) and its reciprocal Data Center infrastructure Efficiency (DCiE) are widely accepted benchmarking standards proposed by the Green Grid to help IT Professionals determine how energy efficient data centers are, and to monitor the impact of their efficiency efforts. Additional benchmarks named Data Center Productivity (DCP) and Data Center energy Productivity (DCeP) probe into the useful work produced by a data center.

SUMMARY

Embodiments of the present invention disclose a method, a computer program product, and a system for minimizing the environmental impact of workloads in multi-data center environments, the computer-implemented method comprising: migrating at least a portion of one or more workloads between one or more data centers automatically to maximize a usage of renewable energy based on a predetermined threshold score of input power and a combination of renewal energy sources; dictating, by a policy engine, where at least a portion of the one or more workloads can be hosted; controlling, by a scheduling engine, how, when, and where at least a portion of the one or more workloads will migrate; and performing data replication to migrate data between a plurality of data center locations.

DETAILED DESCRIPTION

Embodiments of the present invention recognize that the current industry is pushing for both reducing energy usage, and utilizing a higher proportion of renewable energy. Currently, there are targets to reduce the carbon footprint of businesses and organizations. Embodiments of the present invention recognize that power usage effectiveness (PUE) is a factor in data centers (DCs). Embodiments of the present invention recognize that the typical data center comprises an average PUE of 2.5. Meaning that for every 2.5 watts in at the utility meter, only one watt is delivered out to the information technology (IT) load. For example, if the server power rating has a 20 watt (W) maximum power rating then the actual power consumption from the DC perspective will be 20 W*2.5=50 W (including cooling and other activities).

DCs will have different PUE ratio according to a DCs location (e.g., cool, hot, warm, and/or humid), design and efficiency of non-information technology (IT) devices. Compute clusters located in DCs may have multiple hardware (H/W) systems with different power rating. Embodiments of the present invention recognize that each H/W system in compute clusters may not be utilized up to peak capacity to consume the mentioned maximum power rating. Further, embodiments of the present invention recognize that traditional methods of power optimization in DCs have targeted the consolidation of workloads to reduce the number of physical machines in order to power down the excess capacity. For example, if ten servers in a cluster hosting different workloads can be consolidated to six servers then embodiments of the present invention rest four servers by shutting the four servers down to save power.

Additionally, embodiments of the present invention recognize that the current art does not analyze power consumption on a deep level while creating, scheduling, migrating, and failing over one or more workloads. Embodiments of the present invention recognize that current data centers are mainly concerned with the total power consumption of the data center. By measuring and knowing the power consumption of work nodes, it is possible to determine which work nodes can be migrated to other locations. For example, if there are ten servers in a cluster on data center A and four 10 servers can be consolidated into one node and migrated to a different data center then two pairs of four servers each will be consolidated into separate single nodes. In this example, the first single node will be transferred to data center B and the second single node will be migrated to data center C and the two remaining servers will be shutdown.

Embodiments of the present invention solve the issues stated above by executing an efficient carbon footprint awareness mechanism to create, place, and schedule the workload in compute (e.g., virtual machines (VM) or container) clusters. Embodiments of the present invention recognize that organizations need to reduce power usage, and increase the proportion of power generated by renewable energy sources. Organizations can earn carbon credits if implemented in those specific countries and may have targets of only using renewable power by certain dates.

Embodiments of the present invention recognize that edge data centers are increasing in volume (e.g., repurposing exchanges for compute hosting, experimenting with underwater hosting, shipping container based data centers usage is expanding, wherein fifth generation technology standard for broadband cellular networks (5G) is further enabling the possibility of a plurality of small data centers). Further, embodiments of the present invention recognize that traditional methods of power manager, dynamic power will try to turn of individual servers but has an inverse impact to PUE.

However, embodiments of the present invention improve the art and solve the problems stated above by fundamentally migrating the location of the workloads, rather than using load balancing technologies to make green based load balancing decisions. Green technology refers to any technology intended to reduce the impact of humans on the environment. This can include technologies that reduce resource usage as well as incorporate renewable resources. Further, embodiments of the present invention improve the art by solving the solutions stated above by migrating the entire workload or at least a portion of one or more workloads between compatible (i.e., recipient) edge (mainly 5G enabled) data centers automatically to maximize the usage of renewable energy based on the threshold score of the input power based on combination of renewal energy sources (in a hybrid environment where both renewable energy and non-renewable energy sources are available) and shutting down the DC until it is back within the threshold. Additionally, embodiments of the present invention improve the art by (i) shutting down an entire DC or at least a portion of a DC and terminating one or more workloads during a lower renewable power generation period or when the Power Usage Effectiveness (PUE) effectiveness has dropped below a predetermined target threshold, (ii) utilizing a policy engine to dictate where one or more workloads can live and/or execute, (iii) comprising and executing a scheduling engine to control how/when/where workload will migrate, wherein if a suitable target data center cannot be located, a temporary 'lesser ranked' location can be used (transit locations), and (iv) performing data replication for migrating data between data center locations.

Implementation of embodiments of the invention may take a variety of forms, and exemplary implementation details are discussed subsequently with reference to the Figures (i.e., FIG. 1-FIG. 3).

Figure 1:
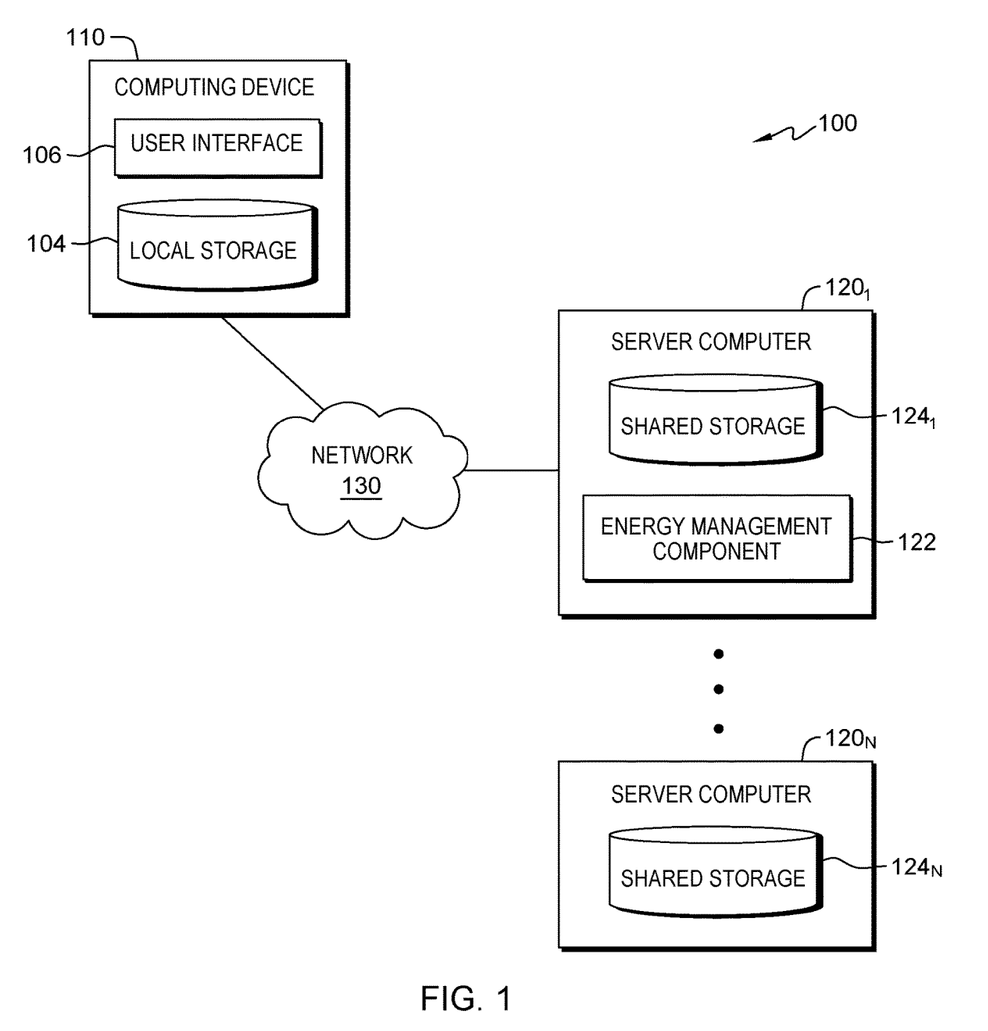
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer $120_{1-N}$, herein after server computer(s) 120 interconnected over network 130. As used herein, N represents a positive integer, and accordingly the number of scenarios implemented in a given embodiment of the present invention is not limited to those depicted in FIG. 1.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer(s) 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer(s) 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer(s) 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to energy management component (component) 122. Computing device 110, via user interface 106, may enable a user and/or a client to interact with component 122 and/or server computer(s) 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer(s) 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer(s) 120 may be a standalone computing device, a management server, a web server, a mobile computing device, one or more client servers, one or more data centers, or any other electronic device or computing system capable of receiving, sending, and processing data. In other embodiments, server computer(s) 120 may represent a server computing system utilizing multiple computers such as, but not limited to, a server system, such as in a cloud computing environment. In another embodiment, server computer(s) 120 may represent a computing system utilizing clustered computers and components (e.g., database server computers, application server computers, etc.) that act as a single pool of seamless resources when accessed within distributed data processing environment 100. Server computer(s) 120 may include internal and external hardware components, as depicted, and described in further detail with respect to FIG. 3. In some embodiments server computer(s) 120 may represent a plurality of server computers.

Each of shared storage 124 and local storage 104 may be a data/knowledge repository and/or a database that may be written and/or read by one or a combination of component 122, server computer(s) 120 and computing device 110. In the depicted embodiment, shared storage 124 resides on server computer(s) 120 and local storage 104 resides on computing device 110. In another embodiment, shared storage 124 and/or local storage 104 may reside elsewhere within distributed data processing environment 100, provided that each may access and is accessible by computing device 110 and server computer(s) 120. Shared storage 124 and/or local storage 104 may each be implemented with any type of storage device capable of storing data and configuration files that may be accessed and utilized by server computer(s) 120, such as, but not limited to, a database server, a hard disk drive, or a flash memory.

In the depicted embodiment, component 122 is executed on a server computer(s) 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer(s) 120, via network 130.

Component 122 may migrate, via network 130, one or more workloads or at least a portion of a workload between recipient edge data centers automatically to maximize the usage of renewable energy. In various embodiments of the present invention, each DC comprises features and data that are tagged and monitored by component 122, wherein the monitored DC features and tagged DC data enable component 122 to identify if a DC is above or below a predetermined threshold. The monitored DC features and tagged DC data comprise, but are not limited to, the energy consumption of the DC, the location of the DC, the country and company policy and guidelines, renewable energy capacity, workload capacity and energy consumption, and/or other DC features and tagged data known in the art. Responsive to identifying a DC is above a predetermined threshold, component 122 flags the DC and makes the DC eligible to receive at least a portion of one or more workloads. Responsive to identifying a DC is below a predetermine threshold, component 122 schedules and/or actively migrates at least a portion of one or more workloads to DCs with higher renewable energy capacities. For example, as wind reduces at a wind farm powered DC, the workload begins migrating to DCs with higher renewable energy capacity. In various embodiments of the present invention, component 122, via dynamic CO2 emission calculator, collects emission data from the workloads establish workload credits and assignments.

In other examples, as sunlight decreases at a solar powered DC, the workload can start migrating to DCs with higher renewable energy capacity or as tidal energy decreases at a water powered DC, the workload can start migrating to DCs with higher renewable energy capacity. Energy sources (renewable and otherwise) would be priorities based on minimizing environmental impact. Component 122 may follow the Energy Model. The energy model is the output of the Emission Calculator and the workload migrater, it represents the behaviors of the enterprise bidders and the cloud providers and the brokerage and the ability to match people to the correct DC. In various embodiments of the present invention, the migrating of one or more workloads results in an entire DC being shut down and the workloads exited or failed over during the lower renewable power generation period or the PUE effectiveness has dropped below a target threshold. In some embodiments, only a portion of the DC is shut down after workload migration occurs.

In various embodiments of the present invention, not depicted in FIG. 1, component 122 comprises a policy engine. The policy engine may dictate where workload can live (e.g., be stored and/or executed). Some workloads may remain in a particular country due to data sovereignty/security, or a state due to distance/latency requirements. In various embodiments of the present invention, component 122 may collect workload specific characteristics (e.g., shared/dedicated infrastructure, location and proximity to other workloads/data sources, data usage, energy usage, and/or any other workload specific characteristics known in the art. In various embodiments of the present invention, not all workloads will migrate to the same place when a data center shuts down (i.e., not all workloads will be migrated to the same data center). For example, some workloads will migrate to a different state and some may be relocated to a data center in a different country. Workloads may be migrated to different countries if security protocols, and thresholds are met or in compliance by the workloads. Component 122 may check and compare the workload characteristics (i.e., workload data) with the security protocols, guidelines, and/or thresholds of one or more particular countries to determine if one or more workloads are eligible to migrate to one or more particular countries (i.e., are in compliance).

In various embodiments of the present invention, not depicted in FIG. 1, component 122 may comprise a scheduling engine, wherein the scheduling engine controls how the workload migrates, when the workload migrates, and where the workload will migrate. For example, if a first workload and a second workload have a predetermined execution time and the second workload is dependent on the output of the first workload then the processing of the second workload is migrated to the beginning of the workload queue, so the second workload is ready when the first workload is complete. In various embodiments of the present invention, component 122, via a schedule engine, may retrieve the historical resource usage of workload (e.g., when is the workload busy) and workload data from local storage 104 and/or shared storage 124. The schedule engine may retrieve and analyze historical power generation data at each data center. In various embodiments of the present invention, component 122, via the schedule engine, predictively places one or more workloads, in one or more DCs, based on anticipated power generation and capacity.

In various embodiments of the present invention, via analytics in a prediction model, component 122 generates placement predictions for one or more workloads, wherein component 122 collects data over time, then uses machine learning techniques to generate one or more placement predictions for one or more workloads based on the collected data. The collected data comprises, but is not limited to: DC capacity, anticipated power generation of a workload, workload data (e.g., size, estimated power consumption, priority settings, security settings, and/or any other workload data features, settings, or constraints known in the art), location of the DC, type of energy used to power the DC (e.g., green energy), number of workloads within a DC, user preferences, and regional and geographical data, security, and energy regulations.

Component 122 may execute transfer speed estimation by determining how long the data (i.e., workload) transfer between locations is likely to take and scheduling transfer actions based on the determined length of time of data transfer between locations, factoring in transfer capacity between X and Y, and volume of data to replicate. In various embodiments of the present invention, if a suitable target data center is unable be located then component 122 identifies and selects a temporary 'poorer choice' location, based on a generated ranked suitable DC list, to be used. A suitable target data center is a data center that is running on green energy. For example, if data center A is registered or identified as using green energy then data center A would be a suitable target data center. Similarly, if data center A is registered or identified as not using green energy then data center A would not be suitable target data center. More specifically if a node needs to be running in a single place for 4 hours, then a suitable node is one that can host that node for 4 hours whilst remaining on green power. Green energy, as it is known and understood in the art, provides the highest environmental benefit and includes power produced by solar, wind, geothermal, biogas, low-impact hydroelectric, and certain eligible biomass sources.

In various embodiments of the present invention, component 122 determines a holistic understanding of edge data centers and predicts the use of the edge data centers based on the determined understanding of the collected data. Components 122 may enable one or more users to specify other constraints such as where the workloads must be stored for regulatory reasons. Further, component 122 may migrate entire data center loads and predict the likely usage of the migrated data center load to ensure continuity of services in a green manner. In various embodiments of the present invention, component 122 migrates entire edge data centers to a plurality of data centers and utilizes predictions and the ability to migrate all workloads to free up one or more data centers. Component 122 may pre-emptively estimate the failover times between data centers, rank the data centres based on the ranking of energy sources, and predict energy usage, capacity and availability of a data centre, coupled with policy control. In various embodiments of the present invention, component 122 predicts energy usage by recording data over time and calculating potential energy consumption based on the recorded and previously recorded and stored data. Component 122 determines what energy usage may be required based on the workload characteristics (i.e., workload data).

A workload may require data to be stored inside a geographical area. For example, workload 1 comprises a geographical constraint due to geographic regulations and must stay within a particular country for banking data. In this example, workload 1 would not be able to migrate to a DC in another country due to the noted constraints. However, in this example, there might be components in workload 1 that could be transferred to another country despite the noted constraints. Component 122 may predict that Mobile data center in location A will be available in two hours' time, due to the weather forecast and knowledge that it is powered by solar energy (or that it is nighttime, and a particular DC is currently not be a good fit).

Component 122 may migrate an entire or at least a portion of a data center workloads and predict the likely usage of the entire or at least a portion of the workload to ensure continuity of services in a green manner. Component may migrate the location of the workloads, rather than using load balancing technologies to make green based load balancing decisions. In various embodiments, component 122 holistically understands and predicts the use of one or more entire edge data centers. Component 122 may enable the consumer (i.e., user) to specify other constraints such as where the workloads can be stored for regulatory reasons.

In various embodiments, component 122 (i) migrates at least a portion of one or more workloads between one or more data centers automatically to maximize a usage of renewable energy based on a predetermined threshold score of input power and a combination of renewal energy sources, (ii) dictates, by a policy engine, where at least a portion of the one or more workloads can be hosted; (iii) controls, by a scheduling engine, how, when, and where at least a portion of the one or more workloads will migrate; (iv) performs data replication to migrate data between a plurality of data center locations, (v) shuts down one or more candidate data centers until the one or more candidate data centers are back within the predetermined threshold score, wherein shutting down the one or more candidate data center comprises: shutting down an entire candidate data center and terminating one or more workloads during a lower renewable power generation period, or when PUE has dropped below a predetermined target threshold, (vi) consolidates at least a portion of one or more workloads in one or more cluster hosts, (vii) executes an efficient carbon footprint awareness mechanism to create, place, and schedule at least a portion of the one or more workloads in compute clusters, (viii) monitors and tags data center data, wherein the data center data comprises: energy consumption of the one or more data centers, location of the one or more data centers, country and company policy and guidelines, renewable energy capacity, and workload capacity and energy consumption, (ix) comparing workload data with one or more security protocols, guidelines, or thresholds of one or more particular countries and one or more states to determine if at least a portion of the one or more workloads are compliant and eligible to migrate to the one or more particular countries, and responsive to determining the workload data is compliant and eligible to migrate to the one or more particular countries and the one or more states, migrating the one or more workloads to one or more recipient data centers in one or more different states or in one or more different countries, and (x) generates placement predictions for at least a portion of the one or more workloads based on collected data, wherein the collected data comprises: data center capacity, anticipated power generation of a workload, workload data, location of the one or more data centers, type of energy used to power the one or more data centers, number of workloads within the one or more data centers, user preferences, and regional and geographical data, security, and energy regulations.

Figure 2:
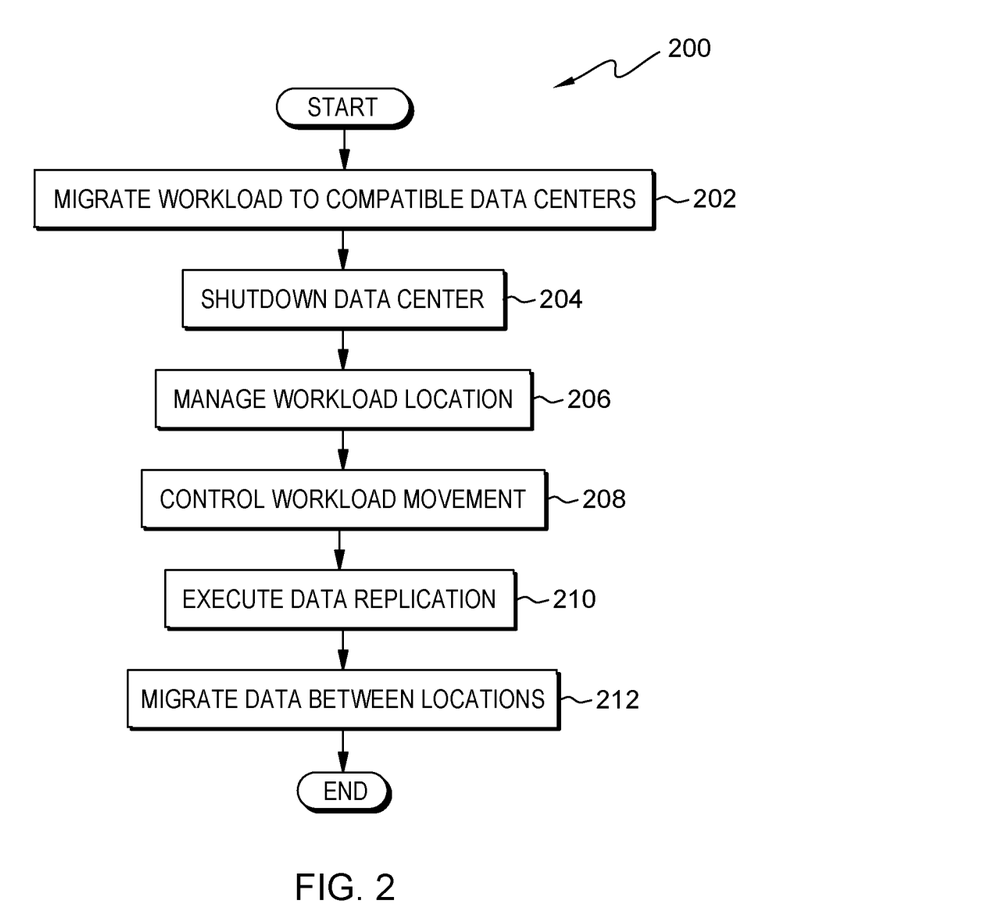
FIG. 2 illustrates operational steps of an energy management component, on a server computer within the distributed data processing environment of FIG. 1, for minimizing the environmental impact of workloads in multi-data center environments, in accordance with an embodiment of the present invention.

FIG. 2 illustrates operational steps of component 122, generally designated 200, in communication with server computer(s) 120 and/or computing device 110, within distributed data processing environment 100 of FIG. 1, for minimizing the environmental impact of workloads in multi-data center environments, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 migrates a workload to a recipient data center. In various embodiments of the present invention, component 122 minimizes the environmental impact of workloads in a multi data center environment by migrating at least a portion of one or more workloads from a candidate data center to a recipient data center based on a predicted energy consumption of the at least a portion of the one or more workloads and the identified energy consumption and type of energy consumed (e.g., green energy) of the recipient data center (i.e., target or compatible data center). A candidate data center is a term to reference an initial data center or the data center that is hosting the workloads or at least a portion of one or more workloads that have been identified for migration. In some embodiments, the minimizing of one or more workloads in a multi data center environment includes 5G. In various embodiments of the present invention, component 122 migrates one or more workloads between recipient edge data centers automatically to maximize the usage of renewable energy based on the threshold score of the input power based on combination of renewal energy sources, in a hybrid environment where both renewable energy and non-renewable energy sources are available, and powers down the DC until it is back within one or more thresholds.

Component 122 may migrate one or more workloads to one or more recipient DCs. Component 122 may identify recipient DCs using mathematical and/or computational models (e.g., sequential models, functional models, and/or concurrent models) based on collected user data, workload data, and/or DC data. For example, component 122 retrieves meta parameters of green powered energy from shared storage 124 or collects the meta parameters of green powered energy from DCs in the predetermined system, wherein component 122 determines if the collected or retrieved data (e.g., user data, workload data, and/or DC data) meet the particular security standards such as the correct geographic regulations, the correct physical security, and correct encryption algorithms based on the collected and/or retrieved data.

In step 204, component 122 shuts down the data center the candidate data center. In various embodiments of the present invention, component 122 powers down the DC of the transferred workload (e.g., candidate data center) until it is back within one or more thresholds, wherein the one or more thresholds are predetermined. In some embodiments, component 122 shuts down one or more DCs until one or more of the DCs are within one or more thresholds, respectfully. In one particular embodiment, component 122 may shutdown an entire DC and terminate one or more workloads during the lower renewable power generation period or the Power Usage Effectiveness (PUE) effectiveness has dropped below a target threshold.

In step 206, component 122 manages workload migration. In various embodiments of the present invention, component 122, via a policy engine for dictating where workload can live, manages the migration of at least a portion of one or more workloads to recipient data centers.

In step 208, component 122 controls workload migration. In various embodiments of the present invention, component 122, via a scheduling engine to control how/when/where workload will migrate, controls one or more workload migration between one or more DCs, wherein, if an identified target data center cannot be located, a temporary 'lower ranked' location is used.

In step 210, component 122 executes data replication. In various embodiments of the present invention, component 122 performs data replication on one or more workloads to migrate data between data centers.

In step 212, component 122 migrate data between locations. In various embodiments of the present invention, component 122 executes a transfer of the replicated one or more workloads from one or more candidate data centers to one or more recipient data centers, wherein the one or more data centers are suitable.

In one example, ten workloads are operating in a datacenter, powered by solar energy, via solar panels. It is known, via collected data center data (i.e., collected data), that the data center's energy consumption will not be 100% green powered in three hours because the sun is setting. The system knows that four workloads are operating on sensitive data and six workloads are predominantly dealing with user traffic. However, only three of the ten workloads will be needed in three hours' time. Based on the collected user data, workload data, and/or data center data, component 122 determines it will take two hours to replicate the data from the workloads to one or more different data centers (e.g., new data centers). In this example, component 122 migrates three of the user nodes to a new data center and schedules three of the workloads to be powered down of when load is reduced. The system schedules data replication to start to ensure data arrives at new data center within three hours. After the data is migrated, and the final synchronization is executed, the four remaining data nodes are migrated to the new data center, and the three user nodes not required, are powered off. Component 122 reduces the DC environmental impact by powering off the current DC (e.g., old DC) resulting in save energy and reduced energy consumption.

Figure 3:
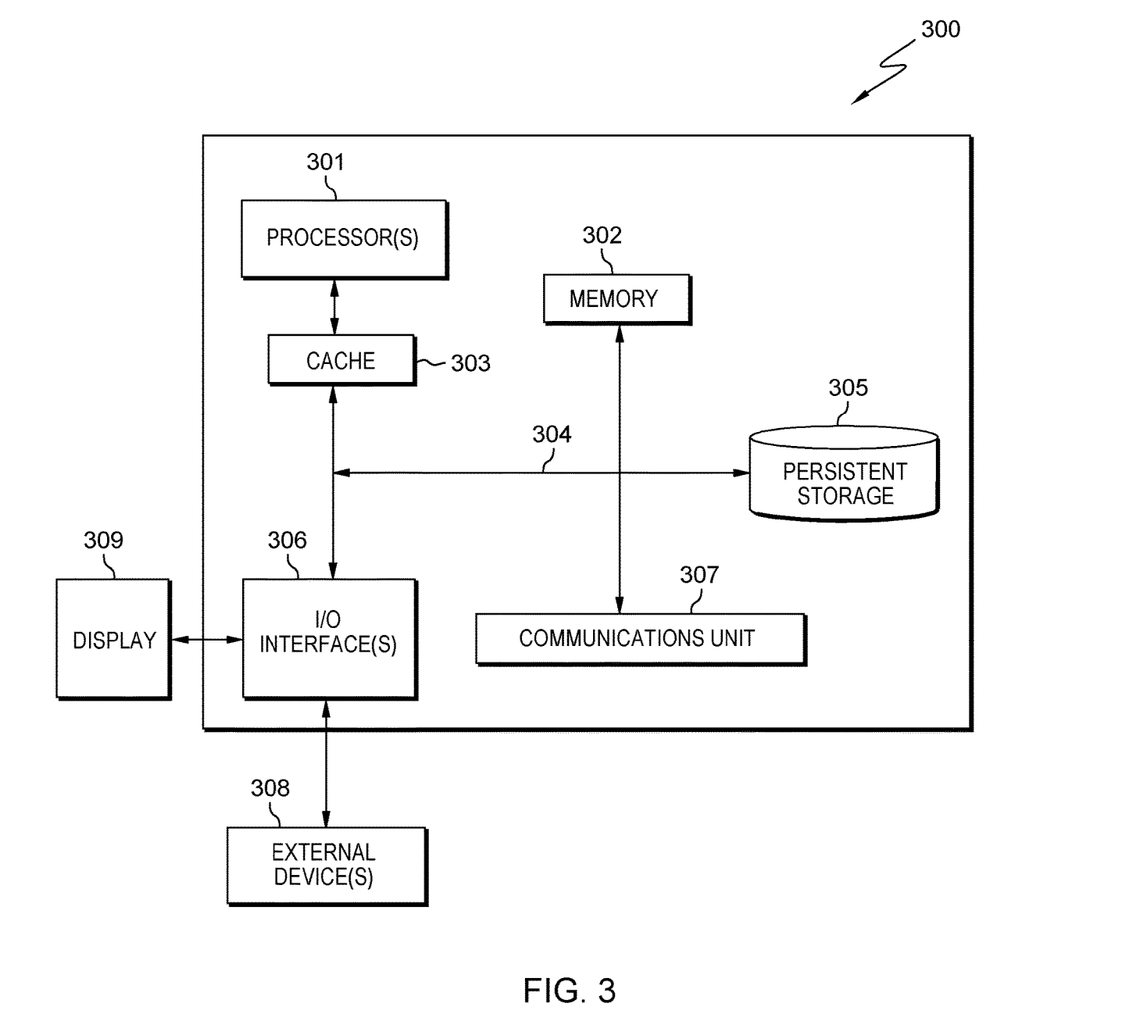
FIG. 3 depicts a block diagram of components of the server computer executing the energy management component within the distributed data processing environment of FIG. 1, in accordance with an embodiment of the present invention.

FIG. 3 depicts a block diagram of components of server computer(s) 120 within distributed data processing environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computing 120 represents an example of computer system 300 that includes component 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for minimizing an environmental impact of workloads among a plurality of data centers, the computer-implemented method comprising:
monitoring, by a hardware-implemented server in communication with the plurality of data centers, a plurality of power usage effectiveness (PUE) factors associated with, and corresponding to, the plurality of data centers;
identifying, by the hardware-implemented server, that a first PUE factor of a first data center, of the plurality of data centers, is below a first threshold value;
in response to the identifying that the first PUE factor is below the first threshold value, identifying, by the hardware-implemented server, a second data center to receive at least a portion of one or more workloads executing at the first data center based on a second PUE factor of the second data center being above a corresponding second threshold value and based on a policy associated with the at least a portion of one or more workloads;
migrating, by the hardware-implemented server, the at least a portion of one or more workloads to the second data center; and
shutting down, by the hardware-implemented server, at least a portion of the first data center corresponding to the at least a portion of one or more workloads until the first PUE factor of the first data center reaches the first threshold value.

2. The computer-implemented method of claim 1, wherein shutting down the at least a portion of the first data center further comprises:
shutting down the entirety of the first data center.

3. The computer-implemented method of claim 1, further comprising:
consolidating the at least a portion of one or more workloads in one or more cluster hosts.

4. The computer-implemented method of claim 1, further comprising:
creating, placing, and scheduling the at least a portion of the one or more workloads in compute clusters.

5. The computer-implemented method of claim 1, further comprising:
monitoring and tagging data center data, wherein the data center data comprises:
the plurality of PUE factors associated with, and corresponding to, the plurality of data centers;
a plurality of energy consumption factors associated with, and corresponding to, the plurality of data centers;
a plurality of locations associated with, and corresponding to, the plurality of data centers;
a plurality of country and company policy and guidelines associated with, and corresponding to, the plurality of data centers;
a plurality of renewable energy capacity factors associated with, and corresponding to, the plurality of data centers; and a plurality of workload capacity factors associated with, and corresponding to, the plurality of data centers.

6. The computer-implemented method of claim 5, further comprising:
comparing workload data associated with the at least a portion of one or more workloads with one or more of security protocols, guidelines, and thresholds associated with a geographical region of the second data center to determine if the at least a portion of the one or more workloads are compliant and eligible to be migrated to the geographical region; and
responsive to determining that the workload data is compliant and eligible to be migrated to the geographical region, migrating the at least a portion of one or more workloads to the second data center.

7. The computer-implemented method of claim 1, wherein identifying the second data center further comprises:
predicting the identification of the second data center based on collected data, wherein the collected data comprises:
data center capacity, anticipated power generation of a workload, workload data, location of the one or more data centers, type of energy used to power the one or more data centers, number of workloads within the plurality of data centers, user preferences, and regional and geographical data, security, and energy regulations.

8. A computer system for minimizing an environmental impact of workloads among a plurality of data centers, the computer system comprising:
a processor that when executing instructions stored in an associated memory is configured to:
monitor a plurality of power usage effectiveness (PUE) factors associated with, and corresponding to, the plurality of data centers;
identify that a first PUE factor of a first data center, of the plurality of data centers, is below a first threshold value;
in response to the identification that the first PUE factor is below the first threshold value, identify a second data center to receive at least a portion of one or more workloads executing at the first data center based on a second PUE factor of the second data center being above a corresponding second threshold value and based on a policy associated with the at least a portion of one or more workloads;
migrate the at least a portion of one or more workloads to the second data center; and
shut down at least a portion of the first data center corresponding to the at least a portion of one or more workloads until the first PUE factor of the first data center reaches the first threshold value.

9. The computer system of claim 8, wherein, when the processor shuts down the at least a portion of the first data center, the processor is further configured to:
shut down the entirety of the first data center.

10. The computer system of claim 8, wherein the processor is further configured to:
consolidate the at least a portion of one or more workloads in one or more cluster hosts.

11. The computer system of claim 8, wherein the processor is further configured to:
create, place, and schedule the at least a portion of the one or more workloads in compute clusters.

12. The computer system of claim 8, wherein the processor is further configured to:
monitor and tag data center data, wherein the data center data comprises:
the plurality of PUE factors of associated with, and corresponding to, the plurality of data centers;
a plurality of energy consumption factors associated with, and corresponding to, the plurality of data centers;
a plurality of locations associated with, and corresponding to, the plurality of data centers;
a plurality of country and company policy and guidelines associated with, and corresponding to, the plurality of data centers;
a plurality of renewable energy capacity factors associated with, and corresponding to, the plurality of data centers; and
a plurality of workload capacity factors associated with, and corresponding to, the plurality of data centers.

13. The computer system of claim 12, wherein the processor is further configured to:
compare workload data associated with the at least a portion of one or more workloads with one or more of security protocols, guidelines, and thresholds associated with a geographical region of the second data center to determine if the at least a portion of the one or more workloads are compliant and eligible to be migrated to the geographical region; and
responsive to a determination that the workload data is compliant and eligible to be migrated to the geographical region, migrate the at least a portion of one or more workloads to the second data center.

14. The computer system of claim 8, wherein, when the processor identifies the second data center, the processor is further configured to:
predict the identification of the second data center based on collected data, wherein the collected data comprises:
data center capacity, anticipated power generation of a workload, workload data, location of the one or more data centers, type of energy used to power the one or more data centers, number of workloads within the one or more plurality of data centers, user preferences, and regional and geographical data, security, and energy regulations.

15. A computer program product for minimizing an environmental impact of workloads among a plurality of data centers, the computer program product comprising a computer readable storage medium having stored thereon instructions, that when executed by a processor, cause the processor to perform:
monitoring a plurality of power usage effectiveness (PUE) factors associated with, and corresponding to, the plurality of data centers;
identifying that a first PUE factor of a first data center, of the plurality of data centers, is below a first threshold value;
in response to the identifying that the first PUE factor is below the first threshold value, identifying a second data center to receive at least a portion of one or more workloads executing at the first data center based on a second PUE factor of the second data center being above a corresponding second threshold value and based on a policy associated with the at least a portion of one or more workloads;
migrating the at least a portion of one or more workloads to the second data center; and shutting down at least a portion of the first data center corresponding to the at least a portion of one or more workloads until the first PUE factor of the first data center reaches the first threshold value.

16. The computer program product of claim 15, wherein shutting down the at least a portion of the first data center further comprises:
shutting down the entirety of the first data center.

17. The computer program product of claim 15, wherein the instructions further cause the processor to perform:
consolidating the at least a portion of one or more workloads in one or more cluster hosts.

18. The computer program product of claim 15, wherein the instructions further cause the processor to perform:
creating, placing, and scheduling the at least a portion of the one or more workloads in compute clusters.

19. The computer program product of claim 15, wherein the instructions further cause the processor to perform:
monitoring and tagging data center data, wherein the data center data comprises:
the plurality of PUE factors of associated with, and corresponding to, the plurality of data centers;
a plurality of energy consumption factors associated with, and corresponding to, the plurality of data centers;
a plurality of locations associated with, and corresponding to, the plurality of data centers;
a plurality of country and company policy and guidelines associated with, and corresponding to, the plurality of data centers;
a plurality of renewable energy capacity factors associated with, and corresponding to, the plurality of data centers; and
a plurality of workload capacity factors associated with, and corresponding to, the plurality of data centers;
comparing workload data associated with the at least a portion of one or more workloads with one or more of security protocols, guidelines, and thresholds associated with a geographical region of the second data center to determine if the at least a portion of the one or more workloads are compliant and eligible to be migrated to the geographical region; and
responsive to determining that the workload data is compliant and eligible to be migrated to the geographical region, migrating the at least a portion of one or more workloads to the second data center.

20. The computer program product of claim 15, wherein identifying the second data center further comprises:
predicting the identification of the second data center based on collected data, wherein the collected data comprises:
data center capacity, anticipated power generation of a workload, workload data, location of the one or more data centers, type of energy used to power the one or more data centers, number of workloads within the plurality of data centers, user preferences, and regional and geographical data, security, and energy regulations.

* * * * *